US012651551B1

(12) United States Patent
Zhou

(10) Patent No.: US 12,651,551 B1
(45) Date of Patent: Jun. 9, 2026

(54) GATE DRIVING CIRCUIT HAVING OUTPUT CONTROL MODULE, DRIVING METHOD FOR DISPLAY PANEL AND DISPLAY PANEL

(71) Applicant: Guangzhou China Star Optoelectronics Semiconductor Display Technology Co., LTd., Guangzhou (CN)

(72) Inventor: Ji Zhou, Guangzhou (CN)

(73) Assignee: Guangzhou China Star Optoelectronics Semiconductor Display Technology Co., LTd., Guangzhou (CN)

( * ) Notice: Subject to any disclaimer, the term of this patent is extended or adjusted under 35 U.S.C. 154(b) by 0 days.

(21) Appl. No.: 19/028,338

(22) Filed: Jan. 17, 2025

(30) Foreign Application Priority Data

Dec. 6, 2024 (CN) ......................... 202411796900.1

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01); *G09G 2330/021* (2013.01)

(58) Field of Classification Search
CPC ......... G09G 3/2092; G09G 2310/0267; G09G 2310/08; G09G 2330/021
See application file for complete search history.

(56) References Cited

U.S. PATENT DOCUMENTS

2012/0256817 A1* 10/2012 Chen ...................... G11C 19/28 345/92
2016/0042708 A1* 2/2016 Wang .................. G09G 3/3611 345/214
2019/0304393 A1* 10/2019 Wang .................. G09G 3/3677

FOREIGN PATENT DOCUMENTS

CN 105590612 A 5/2016
CN 116343666 A 6/2023
CN 118737016 A 10/2024
CN 118737033 A 10/2024

OTHER PUBLICATIONS

Chinese Office Action issued in corresponding Chinese Patent Application No. 202411796900.1 dated Sep. 17, 2025, pp. 1-7.

* cited by examiner

*Primary Examiner* — Adam J Snyder
(74) *Attorney, Agent, or Firm* — PV IP PC; Christopher S. Ruprecht; Wei Te Chung

(57) ABSTRACT

A gate driving circuit, a driving method for a display panel and a display panel are provided. The gate driving circuit includes a plurality of cascaded gate driving sub-circuits. Each gate driving sub-circuit correspondingly controls a row of sub-pixels. Each gate driving sub-circuit includes a pull-up module, a pull-down module and an output control module. The pull-up module controls a potential of a first node according to a first stage transmission signal and a clock signal. The pull-down module controls the potential of the first node according to a preset low potential and a second stage transmission signal. The output control module outputs a corresponding driving signal to a corresponding row of sub-pixels through an output port according to a control signal, the preset low potential and the potential of the first node.

14 Claims, 7 Drawing Sheets

GATE DRIVING CIRCUIT HAVING OUTPUT CONTROL MODULE, DRIVING METHOD FOR DISPLAY PANEL AND DISPLAY PANEL

CROSS-REFERENCE TO RELATED APPLICATIONS

This application claims priority to Chinese Patent Application No. 202411796900.1 filed on Dec. 6, 2024. The disclosure of the aforementioned application is incorporated herein by reference in its entirety.

TECHNICAL FIELD

The present disclosure relates to the technical field of display, in particular to a gate driving circuit, a driving method for a display panel, and a display panel.

BACKGROUND

At present, high refresh rate screens have become standard equipment for mid to high end smart devices. However, high resolution and high refresh rate may bring high power consumption, resulting in higher power consumption and poor endurance of smart devices with high refresh rate display panels.

SUMMARY

In a first aspect, the embodiments of the present disclosure provide a gate driving circuit, including a plurality of cascaded gate driving sub-circuits, each of the gate driving sub-circuits correspondingly controls a row of sub-pixels, and an N-th gate driving sub-circuit includes a pull-up module, a pull-down module, and an output control module. The pull-up module is connected to the first stage transmission signal, a clock signal and a first node. The pull-up module is configured to control a potential of the first node according to the first stage transmission signal and the clock signal. The first stage transmission signal is a scanning signal output by a (N−K)-th stage of the gate driving sub-circuits, and K is greater than 0 and less than N. The pull-down module is connected to a preset low potential, a second stage signal transmission, and the first node. The pull-down module is configured to control the potential of the first node according to the preset low potential and the second stage transmission signal. The second stage transmission signal is a scanning signal output by a (N+M)-th stage of the gate driving sub-circuits, and M is greater than 0. The output control module is connected to a control signal, the preset low potential, the first node, and an output port. The output control module is configured to output a driving signal to a row of sub-pixels corresponding to the N-th stage of the gate driving sub-circuits through the output port according to the control signal, the preset low potential and the potential of the first node.

In a second aspect, the embodiments of the present disclosure further provide a driving method for a display panel. The display panel includes a plurality of cascaded gate driving sub-circuits. Each of the gate driving sub-circuits correspondingly controls a row of sub-pixels. The driving method for the display panel includes: generating a potential of a first node by one of the gate driving sub-circuits according to a first stage transmission signal, a second stage transmission signal, a clock signal and a preset low potential; and outputting a driving signal to a row of sub-pixels corresponding to the one of the gate driving sub-circuits according to the potential of the first node and a control signal.

In a third aspect, the embodiments of the present disclosure further provide a display panel including the gate driving circuit according to any one of the above embodiments.

DETAILED DESCRIPTION

Figure 1:
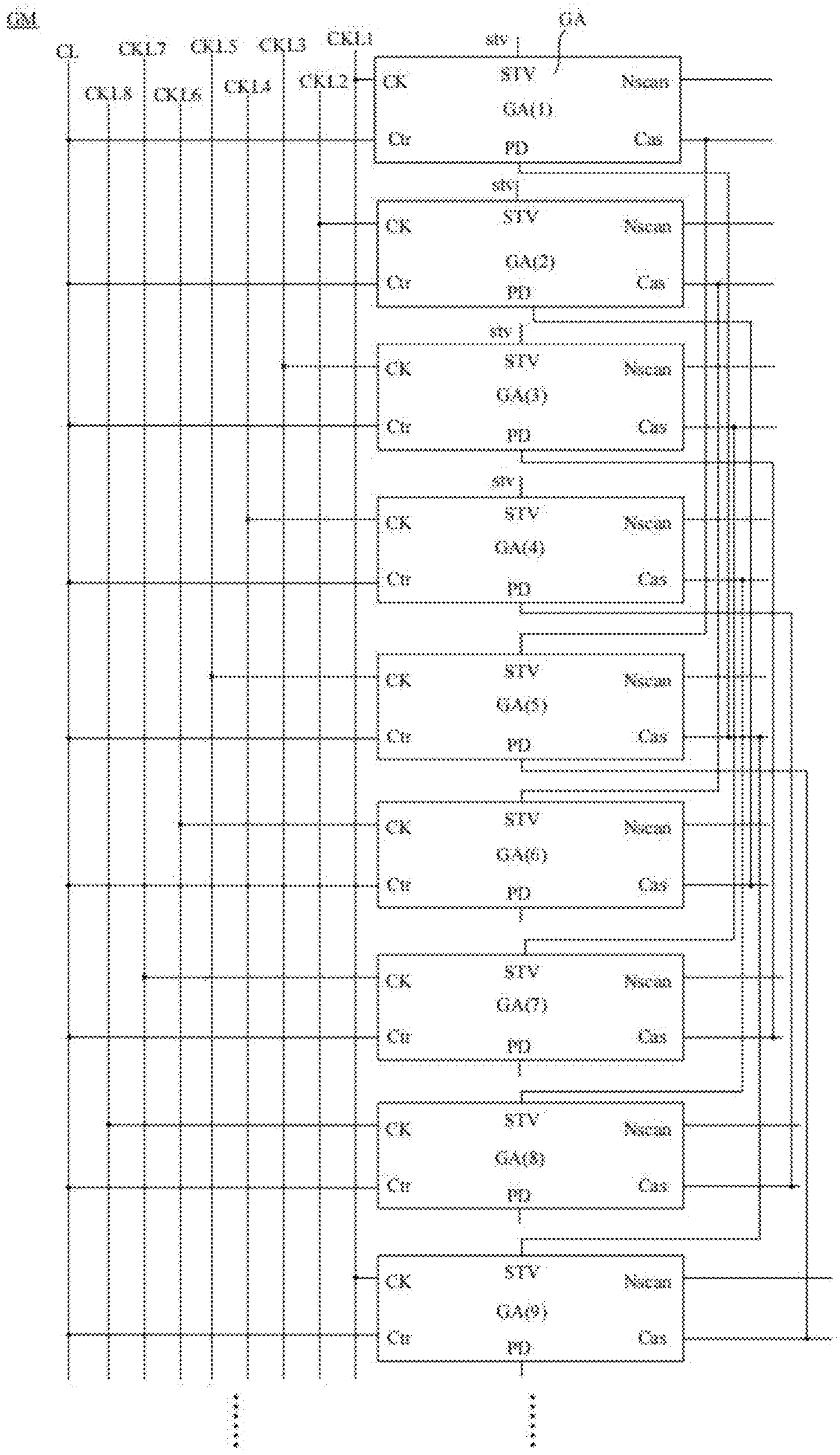
FIG. 1 is a schematic structural diagram of a gate driving circuit provided by some embodiments of the present disclosure.

The technical solutions in the embodiments of the present disclosure will be described hereinafter with reference to the accompanying drawings. The described technical solutions are merely for explaining and illustrating the ideas of the present disclosure, and and should not be construed as limiting the scope of protection of the present disclosure.

In addition, terms such as “first” and “second” are used herein for purposes of description, and should not be interpreted as indication or implication of relative importance, or implied indication of a number of the technical features. Therefore, features limited by terms such as “first” and “second” can explicitly or impliedly include one or more than one of these features. In description of the disclosure, “a plurality of” means two or more than two, unless otherwise specified.

In description of the present disclosure, it should be understood that, unless specified or limited otherwise, the terms “mounted” “connected” “coupled” “fixed” and the like are used broadly, and may be, for example, fixed connections, detachable connections, or integral connections; may also be mechanical connection, electrical connections, or in communication with each other; may also be direct connections or indirect connections via intervening structures; may also be inner communications of two elements or interaction relationships between two elements. For those ordinary skilled in the art, the specific meanings of the above-mentioned terms in the present disclosure can be understood on a case-by-case basis.

The disclosure below provides many different embodiments or examples for implementing different structures of the present disclosure. In order to simplify the present disclosure, components and arrangements of particular examples are described below. Of course, they are examples only and are not intended to limit the present disclosure. In addition, the present disclosure may repeat reference numbers and/or reference letters in different embodiments, and such repetition is for the purpose of simplification and clarity, and does not indicate the relationship between the various embodiments and/or settings discussed. In addition, the present disclosure provides various embodiments of specific processes and materials, but those ordinary skilled in the art may be aware of the use of other processes and/or the use of other materials.

In describing some embodiments, the expressions "coupled" and "connected" and extensions thereof may be used. For example, the term "connected" may be used in describing some embodiments to indicate that two or more elements are in direct physical or electrical contact with each other. As another example, the term "coupled" may be used in describing some embodiments to indicate that two or more elements are in direct physical or electrical contact. However, the term "coupled" or "communicatively coupled" may also refer that two or more elements are not in direct contact with each other but still cooperate or interact with each other. The embodiments disclosed herein are not necessarily limited to the content of the embodiments of the present disclosure.

The various embodiments provided by the present disclosure are similar, and features in different embodiments may be combined with each other.

The use of "configured to" in the embodiments of the present disclosure means open and inclusive language that does not exclude devices suitable for or configured to perform additional tasks or steps.

The order of description of the following embodiments is not intended to limit the preferred order of the embodiments.

In order to solve the problems of high power consumption and poor endurance of smart devices with high refresh rate display panels, some embodiments of the present disclosure provide a gate driving circuit including a plurality of cascaded gate driving sub-circuits. For simplicity of description, the following signal ports/terminals are described with the same reference numeral as the corresponding received or transmitted signals. For example, the clock signal terminal and the clock signal are both denoted by CK, the first node and the first node potential are both denoted by G(N), and the output port and the output driving signal are both denoted by G(N)-AA.

FIG. 1 is a schematic structural diagram of a gate driving circuit provided by some embodiments of the present disclosure. Referring to FIG. 1, the embodiments of the present disclosure provide a gate driving circuit GM. The gate driving circuit GM includes a plurality of cascaded gate driving sub-circuits GA and a plurality of frequency division control lines CL transmitting a plurality of control signals Ctr to the plurality of the gate driving sub-circuits GA. A plurality of the gate driving sub-circuits GA are electrically connected to a plurality of clock lines CKL1 to CKL8. The plurality of the gate driving sub-circuits GA are configured to output scanning signals Nscan to corresponding rows of sub-pixels as gate driving signals, and output to input terminals STV of the corresponding gate driving sub-circuits as input signals or output to pull-down signal control terminals PD of the corresponding gate driving sub-circuits as pull-down control signals. For example, as shown in FIG. 1, a scanning signal Nscan 1 output by a first stage of the gate driving sub-circuits GA(1) is an input signal of a fifth stage of the gate driving sub-circuits GA(5). A scanning signal Nscan 5 output by the fifth stage of the gate driving sub-circuits GA(5) is a pull-down control signal of the first stage of the gate driving sub-circuits GA(1). An input signal of an N-th stage of the gate driving sub-circuits shown in FIG. 1 is a scanning signal output by a (N−4)-th stage of the gate driving sub-circuits. Therefore, the input signals of the previous four stages gate driving sub-circuits are the frame start signal stv.

It should be noted that one frequency division control line CL in FIG. 1 being connected to a plurality of gate driving sub-circuits GA is an exemplary illustration. In practical applications, since the potentials of the control signals Ctr connected to different gate driving sub-circuits are different, each gate driving sub-circuit may be connected to an independent frequency division control line CL respectively, to obtain an independent control signal Ctr, thereby controlling the refresh frequency of each row of sub-pixels. The partitions of the display screen may be provided according to different refresh frequencies. For example, first to 100th rows of sub-pixels share a same frequency division control line CL1, 101st to 1100th rows of sub-pixels share a same frequency division control line CL2, and 1101st to 1200th rows of sub-pixels share a same frequency division control line CL3. Each stage of the gate driving sub-circuits is respectively connected to an independent frequency division control line CL, so that the refresh frequency of each row of sub-pixels may be more flexibly controlled. A partition shares a frequency division control line CL, so that an area of a non-display region of the display panel may be effectively saved.

Figure 2:
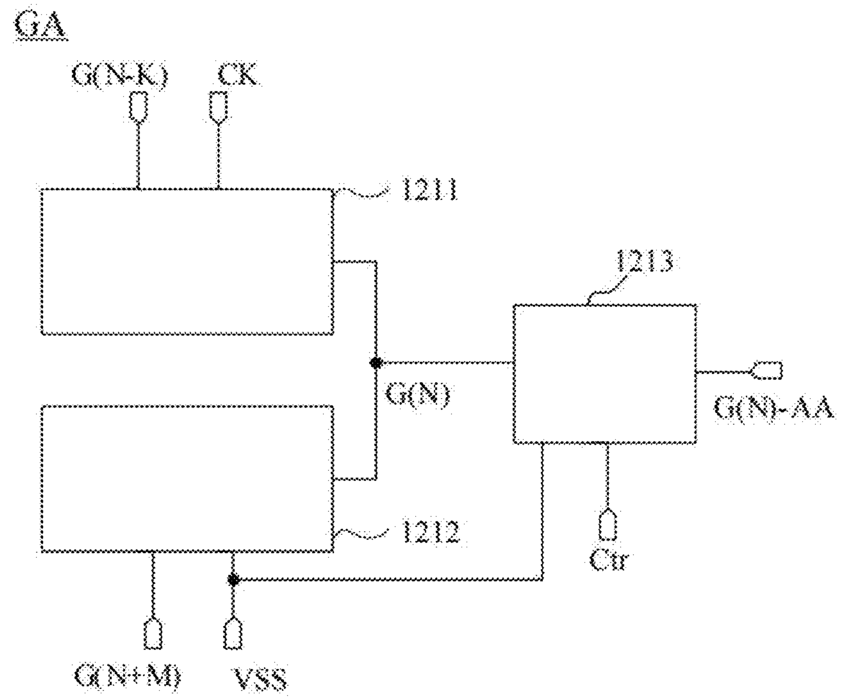
FIG. 2 is a first schematic structural diagram of a gate driving sub-circuit provided by some embodiments of the present disclosure.

FIG. 2 is a first schematic structural diagram of a gate driving sub-circuit provided by some embodiments of the present disclosure. Referring to FIG. 2, the N-th stage of the gate driving sub-circuits GA is described as an example. The gate driving sub-circuit GA includes a pull-up module 1211, a pull-down module 1212, and an output control module 1213.

The pull-up module 1211 is connected to a first stage transmission signal G(N−K), a clock signal CK, and a first node G(N). The pull-up module 1211 is configured to control a potential of the first node G(N) according to the first stage transmission signal G(N−K) and a preset high potential CK. The first stage transmission signal G(N−K) is output from a (N−K)-th stage of the gate driving sub-circuits. K is greater than 0 and less than N.

The pull-down module 1212 is connected to a preset low potential VSS, a second stage transmission signal G(N+M), and the first node G(N). The pull-down module 1212 is configured to control the potential of the first node G(N) according to the preset low potential VSS and the second stage transmission signal G(N+M). The second stage transmission signal G(N+M) is output from the (N+M)-th stage of the gate driving sub-circuits. M is greater than 0.

The output control module 1213 is connected to a control signal Ctr, the preset low potential VSS, the first node G(N), and the output port G(N)-AA. and the output control module 1213 is configured to output a driving signal to the corresponding sub-pixels through the output port G(N)-AA according to the control signal Ctr, the preset low potential VSS, and the potential of the first node G(N).

Through the above configuration, the output control module 1213 may selectively output an effective gate control signal or an ineffective gate control signal for a certain row or several rows of sub-pixels, thereby controlling different display regions of a same display panel to have different refresh rates, and at least solving the problems of high power consumption and poor endurance of smart devices with high refresh rate display panels. Specifically, in the case where the control signal Ctr is at a high potential, the output port G(N)-AA outputs the preset low potential VSS to the pixel row corresponding to the gate driving sub-circuit. In the case where the control signal Ctr is at a low potential, the output port G(N)-AA outputs the potential of the first node G(N) to the pixel row corresponding to the current stage of the gate driving sub-circuits, thereby controlling different display regions of the same display panel to have different refresh rates. By outputting ineffective gate control signals for display rows that do not require high refresh rates, the refresh rate of the corresponding display rows may be reduced, so that the power consumption of the display panel may be effectively reduced, and the endurance of smart devices may be extended.

It should be noted that each unit and control switch in the gate driving circuit may be implemented as a single transistor, a combination of a plurality of transistors, a capacitor, or a combination of a transistor and a capacitor. The transistor used in all embodiments of the present disclosure may be a thin film transistor (TFT), a metal oxide semiconductor (MOS), or other devices having the same characteristics, and the embodiments of the present disclosure are not limited thereto.

For example, the transistor may be a TFT. The TFT may be prepared by a-Si process, an oxide semiconductor process, a low temperature poly-silicon (LTPS) process, or a high temperature poly-silicon (HTPS) process. The embodiments of the present disclosure are not limited thereto.

The embodiments of the present disclosure do not limit the type of transistor. The transistor may be an N-type transistor, a P-type transistor, an enhancement-type transistor, or a depletion-type transistor. In some embodiments of the present disclosure, the present disclosure is illustratively described by taking all transistors as N-type transistors as an example. The N-type transistor is turned on under the action of a high-level voltage signal and turned off under the action of a low-level voltage signal. That is, the operating voltage of the N-type transistor is a high-level voltage, and the shutdown voltage is a low-level voltage.

In the embodiments of the present disclosure, the gate of the transistor is the control electrode. To distinguish the two electrodes of the transistor except the gate electrode, one of the two electrodes is the first electrode and the other of the two electrodes is the second electrode directly described herein. The first electrode of the transistor may be one of the source and the drain of the transistor, and the second electrode may be the other of the source electrode and the drain electrode of the transistor. Since the source and the drain of the transistor may be symmetrical in structure, the source and the drain of the transistor may be structurally indistinguishable.

The capacitor in the embodiments of the present disclosure may be a capacitor device separately manufactured by a process. For example, a capacitor device is realized by manufacturing special capacitor electrodes, and each capacitor electrode (a first plate and a second plate) of the capacitor may be realized by a metal layer, a semiconductor layer (for example, doped polysilicon), or the like. The capacitance may be a parasitic capacitance between transistors, or realized by the transistor itself and other devices and circuits, or by a parasitic capacitance between the circuit itself.

Each of the transistors may further include at least a switch connected in parallel with each of the transistors. The embodiments of the present disclosure are merely examples of the pixel driving circuit and the gate driving circuit, and other structures having the same functions as the pixel driving circuit and the gate driving circuit will not be repeatedly described one by one, but should all fall within the scope of protection of the present disclosure.

The terms "first node", "second node", and the like in the embodiments of the present disclosure do not represent actually existing elements, but represent the convergence points of related electrical connections in the circuit diagram, that is, these nodes are nodes equivalent to the convergence points of related electrical connections in the circuit diagram.

Figure 3:
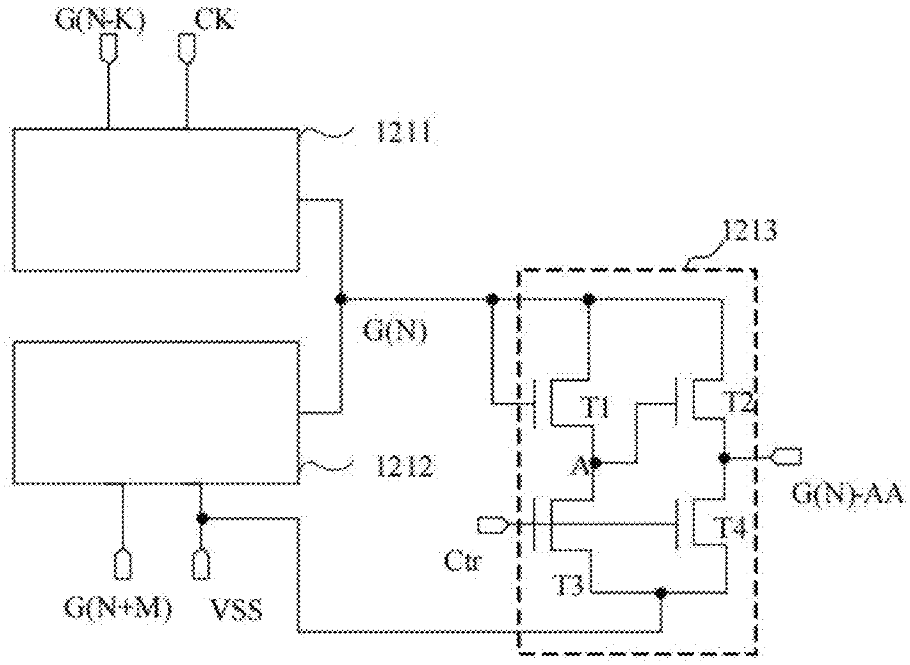
FIG. 3 is a second schematic structural diagram of the gate driving sub-circuit provided by some embodiments of the present disclosure.

FIG. 3 is a second schematic structural diagram of the gate driving sub-circuit provided by some embodiments of the present disclosure. Referring to FIG. 3, in some embodiments, the output control module 1213 is further configured to control the output port G(N)-AA to output the preset low potential VSS to a row of sub-pixels corresponding to the gate driving sub-circuit GA in the case where the control signal Ctr is at a high potential. The output control module 1213 is further configured to control the output port G(N)-AA output the potential of the first node G(N) to a row of sub-pixels corresponding to the gate driving sub-circuit GA in the case where the control signal Ctr is at a low potential.

Referring to FIG. 3, in some embodiments, the output control module 1213 includes a first transistor T1, a second transistor T2, a third transistor T3, and a fourth transistor T4. The first transistor T1 includes a control electrode connected to the first node G(N), a first electrode connected to the first node G(N), and a second electrode connected to the second node A. The second transistor T2 includes a control electrode connected to the second node A, a first electrode connected to the first node G(N), and a second electrode connected to the output port G(N). The third transistor T3 includes a control electrode connected to the control signal Ctr, a first electrode connected to the second node A, and a second electrode connected to the preset low potential VSS. The fourth transistor T4 includes a control electrode connected to the control signal Ctr, a first electrode connected to the output port G(N)-AA, and a second electrode connected to the preset low potential VSS.

The gate driving sub-circuit provided in the embodiments of the present disclosure is equivalent to determining whether an effective signal is output by the output control module 1213 before the gate control signal G(N) is output to the corresponding sub-pixels of the display region. The control signal Ctr is connected to the gate driving sub-circuit GA through a frequency division signal line CL. The frequency division signal line CL may be connected to the timing controller TCON or to the system-on-chip SIC. By providing the control signal Ctr of a certain row or several rows of sub-pixels, it is possible to control whether or not the gate control signal input to the corresponding sub-pixels of the display region is an effective signal.

Referring to FIG. 3, in the case where the control signal Ctr input into the gate driving sub-circuit corresponding to a certain row of sub-pixels is at a low potential, the third transistor T3 and the fourth transistor T4 are turned off, the preset low potential VSS cannot be transmitted to the output port G(N)-AA through the third transistor T3 or the fourth transistor T4, and the potential of the first node G(N) may be transmitted to the output port G(N)-AA. That is, the signal output from the output port G(N)-AA received by the corresponding sub-pixels is consistent with the potential of the first node G(N), and the sub-pixels performs refreshing of the data signal.

When the control signal Ctrl input into the gate driving sub-circuit corresponding to a certain row of sub-pixels is at a high potential, the third transistor T3 and the fourth transistor T4 are turned on, the preset low potential VSS can be transmitted to the output port G(N)-AA through the third transistor T3 or the fourth transistor T4, and the potential of the first node G(N) cannot be normally transmitted to the output port G(N)-AA. That is, the signal output from the output port G(N)-AA received by the corresponding sub-pixels is at a continuous low potential, and the sub-pixel does not perform refreshing of the data signal.

It should be noted that the pull-up module and the pull-down module can be implemented by a conventional gate-driver on array (GOA) circuit, such as 7T2C, 9T2C, or 13T2C, and may be selected according to actual needs, and the embodiments of the present disclosure are not limited thereto.

Figure 4:
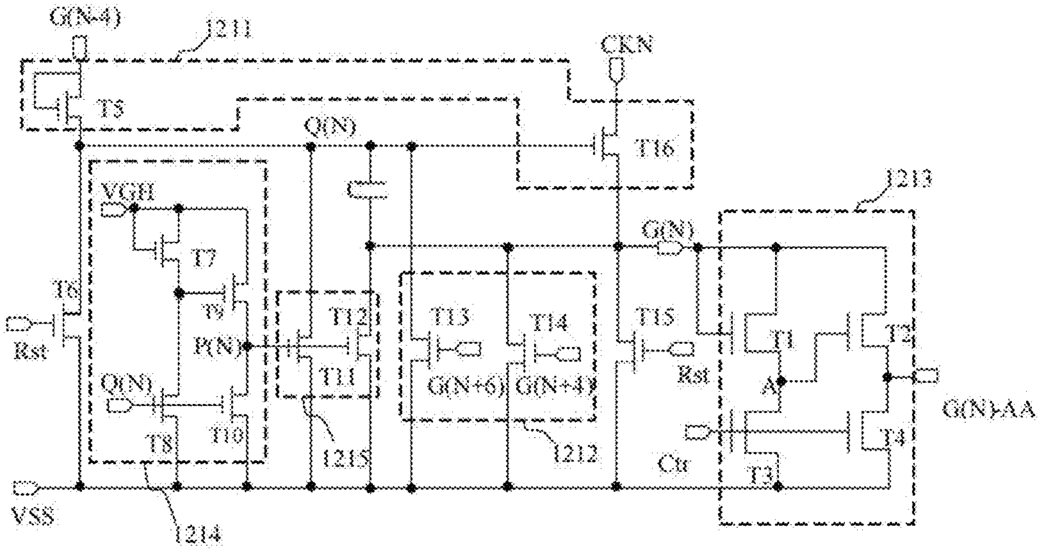
FIG. 4 is a third schematic structural diagram of the gate driving sub-circuit provided by some embodiments of the present disclosure.

FIG. 4 is a third schematic structural diagram of the gate driving sub-circuit provided by some embodiments of the present disclosure. Referring to FIG. 4, the N-th stage of the gate driving sub-circuits GA includes a pull-up module 1211, a pull-down module 1212, an output control module 1213, an inverting module 1214, a pull-down sustain module 1215, and two reset transistors T6 and T15.

The pull-up module 1211 includes a fifth transistor T5 and a sixteenth transistor T16. The control electrode of the fifth transistor T5 is connected to the first electrode of the fifth transistor T5 and the first stage transmission signal G(N−4). The second electrode of the fifth transistor T5 is connected to the third node Q(N). The control electrode of the sixteenth transistor T16 is connected to the third node Q(N). The first electrode of the sixteenth transistor T16 is connected to the clock signal CKN. The second electrode of the sixteenth transistor T16 is connected to the first node G(N). The pull-up module 1211 is configured to turn on the sixteenth transistor T16 in the case where the potential of the third node Q(N) is at a high potential, and output the high potential to the first node G(N) in the case where the clock signal CKN is at a high potential.

The pull-down module 1212 includes a thirteenth transistor T13 and a fourteenth transistor T14. The control electrode of the thirteenth transistor T13 is connected to the second stage transmission signal G(N+6), the first electrode of the thirteenth transistor T13 is connected to the third node Q(N), and the second electrode of the thirteenth transistor T13 is connected to the preset low potential VSS. The control electrode of the fourteenth transistor T14 is connected to the third stage transmission signal G(N+4), the first electrode of the fourteenth transistor T14 is connected to the first node G(N), and the second electrode of the fourteenth transistor T14 is connected to the preset low potential VSS. The thirteenth transistor T13 is configured to pull down the potential of the third node Q(N), and the fourteenth transistor T14 is configured to pull down the potential of the first node G(N).

The inverting module 1214 includes a seventh transistor T7, an eighth transistor T8, a ninth transistor T9, and a tenth transistor T10. The control electrode of the seventh transistor T7 is connected to the first electrode of the seventh transistor T7 and the preset high potential VGH. The second electrode of the seventh transistor T7 is connected to the first electrode of the eighth transistor T8. The control electrode of the eighth transistor T8 is connected to the third node Q(N), the first electrode of the eighth transistor T8 is connected to the second electrode of the seventh transistor T7, and the second electrode of the eighth transistor T8 is connected to the preset low potential VSS. The control electrode of the ninth transistor T9 is connected to the first electrode of the eighth transistor T8, the first electrode of the ninth transistor T9 is connected to the first electrode of the seventh transistor T7, and the second electrode of the ninth transistor T9 is connected to the fourth node P(N). The control electrode of the tenth transistor T10 is connected to the third node Q(N), the first electrode of the tenth transistor T10 is connected to the fourth node P(N), and the second electrode of the tenth transistor T10 is connected to the preset low potential VSS. The inverting module 1214 is configured to invert the potentials of the fourth node P(N) and the third node Q(N).

The pull-down sustain module 1215 includes an eleventh transistor T11 and a twelfth transistor T12. The control electrode of the eleventh transistor T11 is connected to the fourth node P(N). The first electrode of the eleventh transistor T11 is connected to the third node Q(N), and the second electrode of the eleventh transistor T11 is connected to the preset low potential VSS. The control electrode of the twelfth transistor T12 is connected to the fourth node P(N), the first electrode of the twelfth transistor T12 is connected to one end of the bootstrap capacitor C, and the second electrode of the twelfth transistor T12 is connected to the preset low potential VSS. The pull-down maintenance module 1215 is configured to maintain the third node Q(N) and voltage stability. Both ends of the bootstrap capacitor C are connected to the third node Q(N) and the first node G(N), respectively, and are configured to couple the voltage between the third node Q(N) and the first node G(N).

The sixth transistor T6 and the fifteenth transistor T15 are reset transistors and connected to a reset signal, so that the potentials of the third node Q(N) and the first node G(N) may be reset with one key.

In some embodiments, in a first period t1, k-th to m-th stages of the gate driving sub-circuits are all connected to the control signal of a first type, and (m+1)-th to n-th stages of the gate driving sub-circuits are all connected to the control signal of the first type. In a second period t2, k-th to m-th stages of the gate driving sub-circuits are all connected to the control signal of the first type, and the (m+1)-th to n-th stages of the gate driving sub-circuits are all connected to the control signal of a second type, m is greater than k and less than n, t1 is greater than 0, and t2 is greater than 0. One of the control signal of the first type and the control signal of the second type is at a preset high potential, and the other of the control signal of the first type and the control signal of the second type is at a preset low potential.

Figure 5:
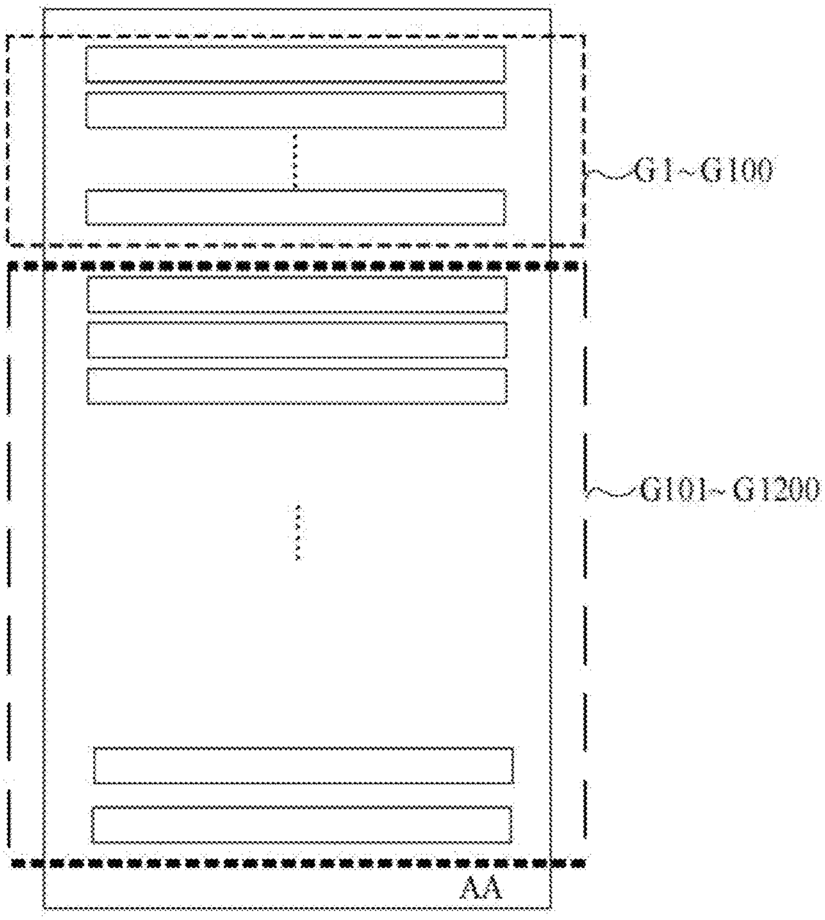
FIG. 5 is a first partition schematic diagram of a display panel provided by some embodiments of the present disclosure.
Figure 6:
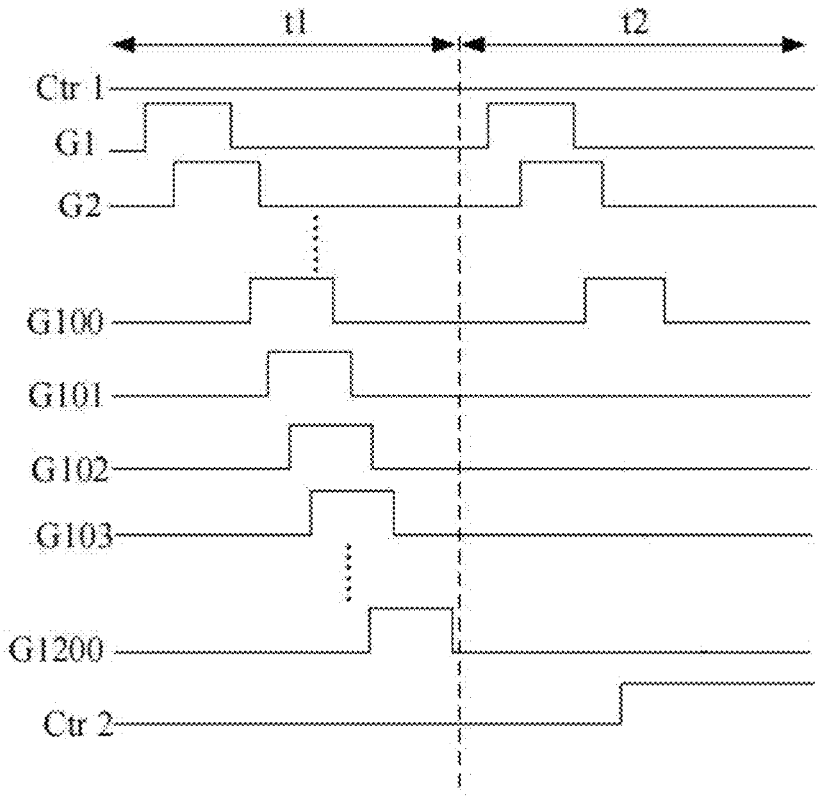
FIG. 6 is a first timing diagram of a control signal provided by some embodiments of the present disclosure.

FIG. 5 is a first partition schematic diagram of a display panel provided by some embodiments of the present disclosure, and FIG. 6 is a first timing diagram of a control signal provided by some embodiments of the present disclosure. Referring to FIGS. 5 and 6, the display region AA of the display panel may be divided into two display partitions with different refresh frequencies. For example, a region where first to 100th rows of sub-pixels are located is a dynamic display region with a refresh frequency of 120 HZ, and a region where 101st to 1200th rows of sub-pixels are located is static display regions with a refresh frequency of 60 HZ. First to 100th stages of the gate driving sub-circuits are connected to the first control signal Ctr1, and 101st to 1200th stages of the gate driving sub-circuits are connected to the second control signal Ctr2. In the first period t1, the first control signal Ctr1 is at a low potential, and the first to 100th stages of the gate driving sub-circuits output an effective signal G(N)-AA. The second control signal Ctr2 is at a low potential, and 101st to 1200th stages of the gate driving sub-circuits output an effective signal G(N)-AA. In the second period t2, the first control signal Ctr1 is at a low potential, the first to 100th stages of the gate driving sub-circuits output an effective signal G(N)-AA. The second control signal Ctr2 is at a high potential, the 101st to 1200th stages of the gate driving sub-circuits output a preset low potential, and data refresh is not performed.

In some embodiments, the region where the first to 100th rows of sub-pixels are located may be used as a static display region with a refresh frequency of 30 HZ, and the region where the 101st to 1200th rows of sub-pixels are located may be used as a dynamic display region with a refresh frequency of 100 HZ. The specific partition and the corresponding refresh frequency may be provided according to the actual application scenario, and the embodiments of the present disclosure are not limited thereto.

In some embodiments, in a first period t1, the (n+1)-th to x-th stages of the gate driving sub-circuits are all connected to the control signal the first type. In the second period t2, the (n+1)-th to x-th stages of the gate driving sub-circuits are all connected to the control signal of the first type, and x is greater than n.

Figure 7:
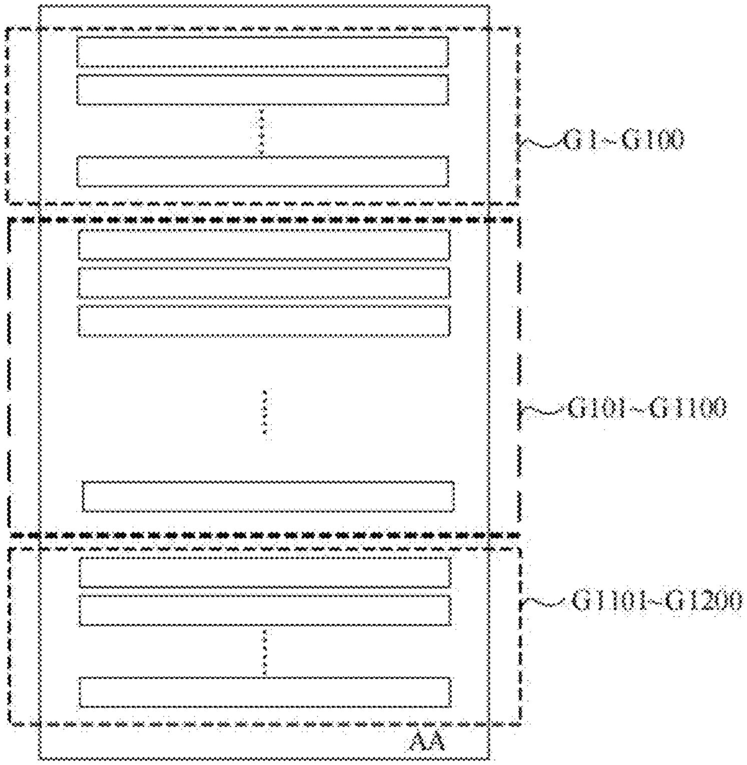
FIG. 7 is a second partition schematic diagram of the display panel provided by some embodiments of the present disclosure.
Figure 8:
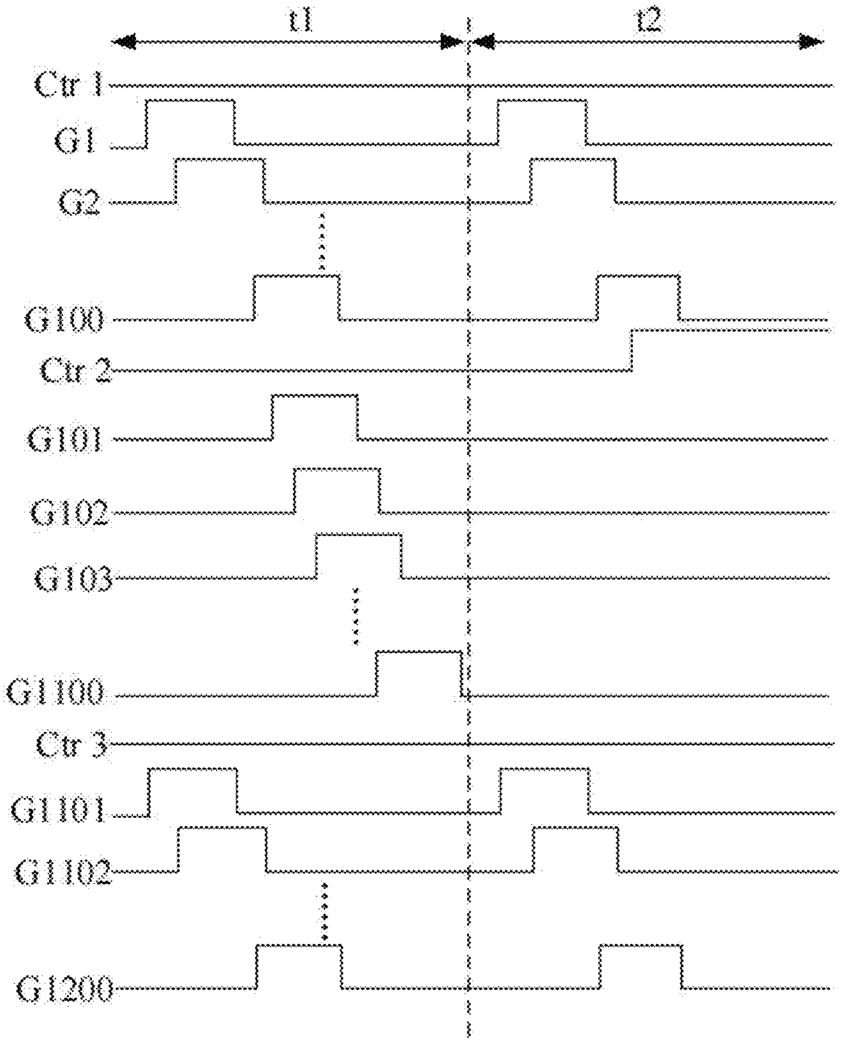
FIG. 8 is a second timing diagram of the control signal provided by some embodiments of the present disclosure.

FIG. 7 is a second partition schematic diagram of the display panel provided by some embodiments of the present disclosure, and FIG. 8 is a second timing diagram of the control signal provided by some embodiments of the present disclosure. Referring to FIGS. 7 and 8, the display region AA of the display panel may be divided into three display partitions with different refresh frequencies. For example, a region where first to 100th rows of sub-pixels are located is a dynamic display region with a refresh frequency of 120 HZ, a region where 101st to 1100th rows of sub-pixels are located is a static display region with a refresh frequency of 60 HZ, and a region where 1101st to 1200th rows of sub-pixels are located is a dynamic display region with a refresh frequency of 120 HZ. First to 100th stages of the gate driving sub-circuits are connected to the first control signal Ctr1, 101st to 1100th stages of the gate driving sub-circuits are connected to the second control signal Ctr2, and 1101st to 1200th stages of the gate driving sub-circuits are connected to the third control signal Ctr3. In the first period t1, the first control signal Ctr1 is at a low potential, the first to 100th stages of the gate driving sub-circuits output an effective signal G(N)-AA, the second control signal Ctr2 is at a low potential, the 101st to 1100th stages of the gate driving sub-circuits output an effective signal G(N)-AA, and the third control signal Ctr3 is at a low potential, the 1101st to 1200th stages of the gate driving sub-circuits output an effective signal G(N)-AA. In the second period t2, the first control signal Ctr1 is at a low potential, the first to 100th stages of the gate driving sub-circuits output an effective signal G(N)-AA, the second control signal Ctr2 is at a high potential, the 101st to 1100th stages of the gate driving sub-circuits output a preset low potential, and data refresh is not performed, and the third control signal Ctr3 is at a low potential, the 1101st to 1200th stage gate driver sub-circuits output an effective signal G(N)-AA.

In the timing shown in FIG. 8, the refresh frequency of the first to 100th rows of sub-pixels is the same as the refresh frequency of 1101st to 1200th rows of sub-pixels, and the timing control of the specific control signal may be reversed to that shown in FIG. 8. For example, the region where the first to 100th rows of sub-pixels are located may be a static display region with a refresh frequency of 60 HZ, the region where the 101st to 1100th rows of sub-pixels are located may be a dynamic display region with a refresh frequency of 120 HZ, and the region where the 1101st to 1200th rows of sub-pixels are located may be a a static display region with a refresh frequency of 60 HZ. Correspondingly, the first control signal Ctr1 may be at a low potential in the first period t1 and at a high potential in the second period t2, the second control signal Ctr2 may be at a low potential in both the first period t1 and the second period t2, and the third control signal Ctr3 is at a low potential in the first period t1 and at a high potential in the second period t2.

In some embodiments, in the third period t3, the k-th to m-th gate driving sub-circuits are all connected to the control signal of the first type, the (m+l)-th to n-th gate driving sub-circuits are all connected to the control signal of the second type, and the (n+l)-th to x-th gate driving sub-circuits are all connected to the control signal of the second type, where t3 is greater than 0.

Figure 9:
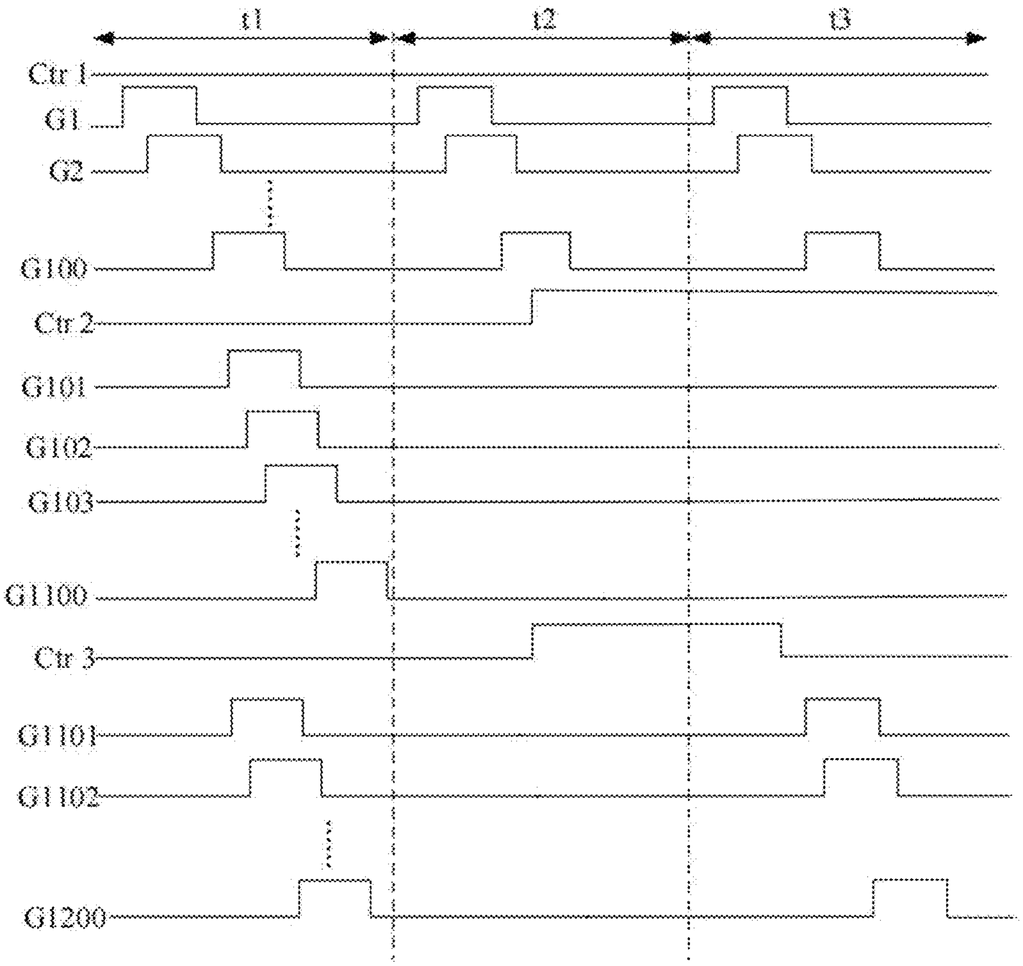
FIG. 9 is a third timing diagram of the control signal provided by some embodiments of the present disclosure.

FIG. 9 is a third timing diagram of the control signal provided by some embodiments of the present disclosure. Referring to FIG. 9, the display panel may be divided into three partitions, and the refresh frequencies of the three partitions are different. The first to 100th stages of the gate driving sub-circuits are connected to the first control signal Ctr1, the 101st to 1100th stages of the gate driving sub-circuits are connected to the second control signal Ctr2, and the 1101st to 1200th stages of the gate driving sub-circuits are connected to the third control signal Ctr3. In the first period t1, the second period t2, and the third period t3, the first control signal Ctr1 is at a low-potential, and the first to 100th stages of the gate driving sub-circuits always output the effective signal G(N)-AA. The second control signal Ctr2 is at a low potential in the first period t1, the 101st to 1100th stages of the gate driving sub-circuits output an effective signal G(N)-AA. The second control signal Ctr2 is at a high potential in the second period t2 and the third period t3, the 101st to 1100th stages of the gate driving sub-circuits output a preset low potential, and data refresh is not performed. The third control signal Ctr3 is at a low potential in the first period t1, the 1101st to 1200th stages of the gate driving sub-circuits output an effective signal G(N)-AA. The third control signal Ctr3 is at a high potential in the second period t2, the 1101st to 1200th stages of the gate driving sub-circuits output a preset low potential, and data refresh is not performed. The third control signal Ctr3 is at a low potential in the third period t3, and the 1101st to 1200th stages of the gate driving sub-circuits output an effective signal G(N)-AA.

Figure 10:
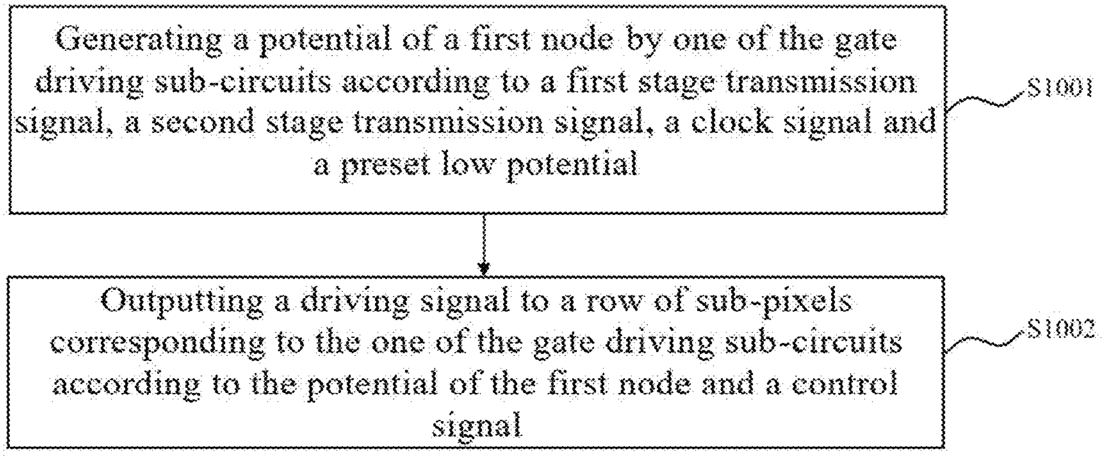
FIG. 10 is a flowchart of a driving method for a display panel provided by some embodiments of the present disclosure.

FIG. 10 is a flowchart of a driving method for a display panel provided by some embodiments of the present disclosure. Referring to FIG. 10, some embodiments of the present disclosure further provide a driving method for a display panel, and the driving method is realized by the gate driving circuit in any of the above embodiments, and what has been described is not repeated here.

The above driving method includes the following steps S1001 and S1002.

At step S1001, the gate driving sub-circuit generates the potential of the first node according to the first stage transmission signal, the second stage transmission signal, the clock signal and the preset low potential.

At step S1002, a driving signal is output to a row of sub-pixels corresponding to the gate driving sub-circuit according to the potential of the first node and the control signal.

In some embodiments, the above step S1002 may be implemented by the following step S11.

At step S11, in the case where the control signal is at a preset high potential, the preset low potential is output to the row of sub-pixels corresponding to the gate driving sub-circuit.

In some embodiments, the above step S1002 may be implemented by the following step S21.

At step S21, in the case where the control signal is at a preset low potential, the potential of the first node is output to the the row of sub-pixels corresponding to the gate driving sub-circuit.

In some embodiments, the above step S1002 may be implemented by the following steps.

In the first period t1, the control signal of the first type is input to the k-th to m-th stages of the gate driving sub-circuits, and the control signal of the first type is input to the (m+1)-th to n-th stages of the gate driving sub-circuits, so that a driving signal of a first type is output to the k-th to n-th rows of sub-pixels.

In the first period t2, the control signal of the first type is input to the k-th to m-th stages of the gate driving sub-circuits to output the driving signal of the first type to the k-th to m-th rows of sub-pixels, and the control signal of a second type is input to the (m+1)-th to n-th stages of the gate driving sub-circuits to output a driving signal of a second type to the (m+1)-th to n-th rows of sub-pixels.

m is greater than k and less than n, t1 is greater than 0, and t2 is greater than 0. One of the control signal of the first type and the control signal of the second type is at a preset high potential and the other of the control signal of the first type and the control signal of the second type is at a preset low potential.

In some embodiments, in a first period t1, the control signal of the first type is input to (n+1)-th to x-th stages of the gate driving sub-circuits to output the driving signal of the first type to (n+1)-th to x-th rows of sub-pixels. In a second period t2, the control signal of the first type is input to the (n+1)-th to x-th stages of the gate driving sub-circuits to output the driving signal of the first type to the (n+1)-th to x-th rows of sub-pixels, where x is greater than n.

In some embodiments, in a third period t3, the control signal of the first type is input to k-th to m-th stages of the gate driving sub-circuits to output the driving signal of the first type to the k-th to m-th rows of sub-pixels, the control signal of the second type is input to (m+1)-th to n-th stages of the gate driving sub-circuits to output the driving signal of the second type to (m+1)-th to n-th rows of sub-pixels, and the control signal of the second type is input to (n+1)-th to x-th stages of the gate driving sub-circuits to output the driving signal of the second type to (n+1)-th to x-th rows of sub-pixels, where t3 is greater than 0.

According to the potential of the first node and the control signal, the driving signal is output to a row of sub-pixels corresponding to the gate driving sub-circuit, so that whether the signal output by each stage of the gate driving sub-circuits is an effective scanning signal may be effectively controlled. The display panel may be partitioned, and the refresh rate of some display regions may be reduced. At least the problems of high power consumption and poor endurance of smart devices with high refresh rate display panels is solved, so that different display regions of a same display panel may be controlled to have different refresh rate. For display rows that do not require high refresh rates, the effective gate control signals may be output to reduce the refresh rate of the corresponding display rows, so that the power consumption of the display panel may be effectively reduced, and the endurance of smart devices may be extended.

Figure 11:
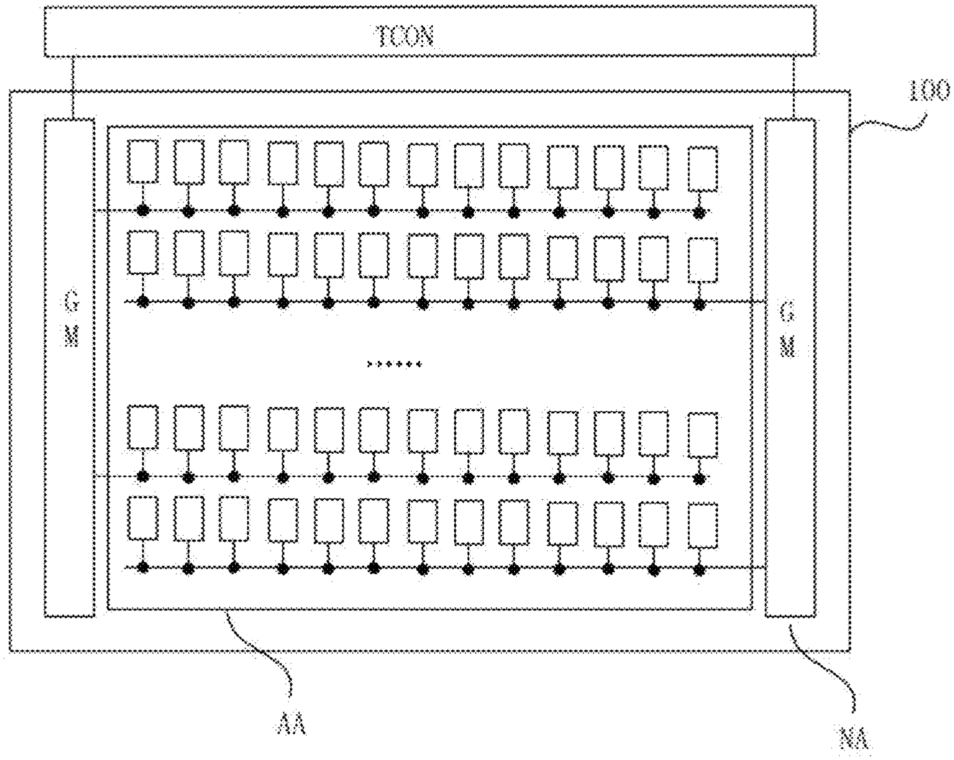
FIG. 11 is a schematic structural diagram of a display panel provided by some embodiments of the present disclosure.

FIG. 11 is a schematic structural diagram of a display panel provided by some embodiments of the present disclosure. Referring to FIG. 11, some embodiments of the present disclosure further provide a display panel 100 including the gate driving circuit GM described in any of the above embodiments. The display panel 100 includes an effective display region AA and a non-display region NA located around the effective display region AA. The gate driving circuit GM is provided in the non-display region NA, and receives a clock signal and a control signal from the timing controller TCON.

Some embodiments of the present disclosure further provide a non-transitory computer-readable storage medium, and a computer program may be stored in the storage medium. When executed by a processor, the steps of the above-described driving method for driving a display panel may be implemented. The non-transitory computer-readable storage medium has all the beneficial effects of the above-described driving method for the display panel, and will not be repeatedly described herein.

The computer-readable storage medium may be, for example, an electrical, magnetic, optical, electromagnetic, infrared, or semiconductor system, apparatus, or device, or any combination thereof, which is not specifically limited in the present disclosure. More specific examples of computer-readable storage media may include, but are not limited to, an electrical connection having one or more wires, a portable computer magnetic disk, a hard disk, a random access memory (RAM), a read-only memory (ROM), an erasable programmable read-only memory (EPROM or flash memory), an optical fiber, a portable compact magnetic disk read-only memory (CD-ROM), an optical storage device, a magnetic storage device, or any suitable combination thereof.

In some embodiments of the present disclosure, the computer-readable storage medium may be any tangible medium containing or storing a program that may be used by or in conjunction with an instruction execution system, an apparatus, or a device.

Computer program code for performing the operations of some embodiments of the present disclosure may be written in one or more programming languages, or combinations thereof, including object-oriented programming languages such as java, smalltalk, C++, and conventional procedural programming languages such as "C" language or similar programming languages. The program code may be executed entirely or partially on the user computer, partially on the user computer, as a stand-alone software package, partially on the user computer and partially on a remote computer, or entirely on a remote computer or server. In cases involving a remote computer, the remote computer may be connected to the user computer through any kind of network, including a local area network (LAN) or a wide area network (WAN), or may be connected to an external computer (e.g., using an internet service provider to connect over the Internet).

In summary, the embodiments of the present disclosure provide a gate driving circuit, a driving method for a display panel and a display panel are provided. The gate driving circuit includes a plurality of cascaded gate driving sub-circuits. Each gate driving sub-circuit correspondingly controls a row of sub-pixels. Each gate driving sub-circuit includes a pull-up module, a pull-down module and an output control module. The pull-up module controls a potential of a first node according to a first stage transmission signal and a clock signal. The pull-down module controls the potential of the first node according to a preset low potential and a second stage transmission signal. The output control module outputs a corresponding driving signal to a corresponding row of sub-pixels through an output port according to a control signal, the preset low potential and the potential of the first node. Through the above configuration, the output control module may selectively output a valid gate control signal or an invalid gate control signal for a certain row of sub-pixels, thereby controlling different display regions of a same display panel to have different refresh rates. For display rows that do not require high refresh rates, the effective gate control signals may be output to reduce the refresh rate of the corresponding display rows, and at least the problems of high power consumption and poor endurance of smart devices with high refresh rate display panels is solved, so that the power consumption of the display panel may be effectively reduced, and the endurance of smart devices may be extended. The principle and implementations of the present disclosure are described in this specification by using specific examples. The description about the foregoing embodiments is merely provided to help understand the method and core ideas of the present disclosure. In addition, those skilled in the art can make modifications in terms of the specific implementations and application scopes according to the ideas of the present disclosure. Therefore, the content of this specification shall not be construed as a limit to the present disclosure.

The above is merely specific embodiments of the present disclosure, but the scope of protection of the present disclosure is not limited thereto. Any changes or replacements that are thought of by those skilled in the art within the technical scope disclosed in the present disclosure should be covered within the scope of protection of the present disclosure. Therefore, the scope of protection of the present disclosure should be based on the scope of protection of the claims.

What is claimed is:

1. A gate driving circuit, comprising a plurality of cascaded gate driving sub-circuits, wherein each of the gate driving sub-circuits correspondingly controls a row of sub-pixels, and an N-th stage of the gate driving sub-circuits comprises:

a pull-up module connected to a first stage transmission signal, a clock signal and a first node, wherein the pull-up module is configured to control a potential of the first node according to the first stage transmission signal and the clock signal, the first stage transmission signal is a scanning signal output by a (N−K)-th stage of the gate driving sub-circuits, and K is greater than 0 and less than N;

a pull-down module connected to a preset low potential, a second stage transmission signal and the first node, wherein the pull-down module is configured to control the potential of the first node according to the preset low potential and the second stage transmission signal, the second stage transmission signal is a scanning signal output by a (N+M)-th stage of the gate driving sub-circuits, and M is greater than 0; and an output control module connected to a control signal, the preset low potential, the first node, and an output port, wherein the output control module is configured to output a driving signal to a row of sub-pixels corresponding to the N-th stage of the gate driving sub-circuits through the output port according to the control signal, the preset low potential and the potential of the first node;

wherein the output control module comprises:

a first transistor comprising a control electrode connected to the first node, a first electrode connected to the first node, and a second electrode connected to a second node;

a second transistor comprising a control electrode connected to the second node, a first electrode connected to the first node, and a second electrode connected to the output port;

a third transistor comprising a control electrode connected to the control signal, a first electrode connected to the second node, and a second electrode connected to the preset low potential; and a fourth transistor comprising a control electrode connected to the control signal, a first electrode connected to the output port, and a second electrode connected to the preset low potential.

2. The gate driving circuit of claim 1, wherein the output control module is further configured to:

control the output port to output the preset low potential to the row of sub-pixels corresponding to the N-th stage of the gate driving sub-circuits in a case where the control signal is at a high potential; and control the output port to output the potential of the first node to the row of sub-pixels corresponding to the N-th stage of the gate driving sub-circuits in a case where the control signal is at a low potential.

3. The gate driving circuit of claim 2, wherein, in a first period t1, k-th to m-th stages of the gate driving sub-circuits are connected to the control signal of a first type, and (m+1)-th to n-th stages of the gate driving sub-circuits are connected to the control signal of the first type;

in a second period t2, the k-th to m-th stages of the gate driving sub-circuits are connected to the control signal of the first type, and the (m+1)-th to n-th stages of the gate driving sub-circuits are connected to the control signal of a second type; and m is greater than k and less than n, t1 is greater than 0, t2 is greater than 0, one of the control signal of the first type and the control signal of the second type is at a high potential, and another one of the control signal of the first type and the control signal of the second type is at a low potential.

4. The gate driving circuit of claim 3, wherein, in the first period t1, (n+1)-th to x-th stages of the gate driving sub-circuits are connected to the control signal of the first type; and in the second period t2, the (n+1)-th to x-th stages of the gate driving sub-circuits are connected to the control signal of the first type;

wherein x is greater than n.

5. The gate driving circuit of claim 4, wherein, in a third period t3, the k-th to m-th stages of the gate driving sub-circuits are connected to the control signal of the first type, the (m+1)-th to n-th stages of the gate driving sub-circuits are connected to the control signal of the second type, the (n+1)-th to x-th stages of the gate driving sub-circuits are connected to the control signal of the second type, and t3 is greater than 0.

6. A driving method for a display panel, wherein the display panel comprises a plurality of cascaded gate driving sub-circuits, each of the gate driving sub-circuits correspondingly controls a row of sub-pixels, and an N-th stage of the gate driving sub-circuits comprises:

a pull-up module connected to a first stage transmission signal, a clock signal and a first node, wherein the pull-up module is configured to control a potential of the first node according to the first stage transmission signal and the clock signal, the first stage transmission signal is a scanning signal output by a (N−K)-th stage of the gate driving sub-circuits, and K is greater than 0 and less than N;

a pull-down module connected to a preset low potential, a second stage transmission signal and the first node, wherein the pull-down module is configured to control the potential of the first node according to the preset low potential and the second stage transmission signal, the second stage transmission signal is a scanning signal output by a (N+M)-th stage of the gate driving sub-circuits, and M is greater than 0; and an output control module connected to a control signal, the preset low potential, the first node, and an output port, wherein the output control module is configured to output a driving signal to a row of sub-pixels corresponding to the N-th stage of the gate driving sub-circuits through the output port according to the control signal, the preset low potential and the potential of the first node;

wherein the output control module comprises:

a first transistor comprising a control electrode connected to the first node, a first electrode connected to the first node, and a second electrode connected to a second node;

a second transistor comprising a control electrode connected to the second node, a first electrode connected to the first node, and a second electrode connected to the output port;

a third transistor comprising a control electrode connected to the control signal, a first electrode connected to the second node, and a second electrode connected to the preset low potential; and a fourth transistor comprising a control electrode connected to the control signal, a first electrode connected to the output port, and a second electrode connected to the preset low potential; and wherein the driving method for the display panel comprises:

generating a potential of a first node by one of the gate driving sub-circuits according to a first stage transmission signal, a second stage transmission signal, a clock signal and a preset low potential; and outputting a driving signal to a row of sub-pixels corresponding to the one of the gate driving sub-circuits according to the potential of the first node and a control signal;

wherein the step of outputting the driving signal to the row of sub-pixels corresponding to the one of the gate driving sub-circuits according to the potential of the first node and the control signal comprises:

outputting the preset low potential to the row of sub-pixels corresponding to the one of the gate driving sub-circuits based on conduction of the third transistor and the fourth transistor when the control signal is at a high potential; and outputting a potential of the first node to the row of sub-pixels corresponding to the one of the gate driving sub-circuits based on conduction of the first transistor and the second transistor when the control signal is at a low potential.

7. The driving method for the display panel of claim 6, the step of outputting the driving signal to the row of sub-pixels corresponding to the one of the gate driving sub-circuits according to the potential of the first node and the control signal comprises:

inputting the control signal of a first type to k-th to m-th stages of the gate driving sub-circuits and inputting the control signal of the first type to (m+1)-th to n-th stages of the gate driving sub-circuits in a first period t1 to output the driving signal of the first type to k-th to n-th rows of sub-pixels; and inputting the control signal of the first type to the k-th to m-th stages of the gate driving sub-circuits in a second period t2 to output the driving signal of the first type to k-th to m-th rows of sub-pixels; and inputting the control signal of a second type to the (m+1)-th to n-th stages of the gate driving sub-circuits in the second period t2 to output the driving signal of a second type to (m+1)-th to n-th rows of sub-pixels;

wherein m is greater than k and less than n, t1 is greater than 0, t2 is greater than 0, one of the control signal of the first type and the control signal of the second type is at a high potential, and another one of the control signal of the first type and the control signal of the second type is at a low potential.

8. The driving method for the display panel of claim 7, wherein the driving method further comprises:

inputting the control signal of the first type to (n+1)-th to x-th stages of the gate driving sub-circuits in the first period t1 to output the driving signal of the first type to (n+1)-th to x-th rows of sub-pixels; and inputting the control signal of the first type to the (n+1)-th to x-th stages of the gate driving sub-circuits in the second period t2 to output the driving signal of the first type to the (n+1)-th to x-th rows of sub-pixels;

wherein x is greater than n.

9. The driving method for the display panel of claim 8, wherein the driving method further comprises:

inputting the control signal of the first type to the k-th to m-th stages of the gate driving sub-circuits in a third period t3 to output the driving signal of the first type to k-th to m-th rows of sub-pixels; inputting the control signal of the second type to the (m+1)-th to n-th stages of the gate driving sub-circuits in the third period t3 to output the driving signal of the second type to the (m+1)-th to n-th rows of sub-pixels; and inputting the control signal of the second type to the (n+1)-th to x-th stages of the gate driving sub-circuits in the third period t3 to output the driving signal of the second type to the (n+1)-th to x-th rows of sub-pixels;

wherein t3 is greater than 0.

10. A display panel, comprising a gate driving circuit, wherein the gate driving circuit comprises a plurality of cascaded gate driving sub-circuits, each of the gate driving sub-circuits correspondingly controls a row of sub-pixels, and an N-th stage of the gate driving sub-circuits comprises:

a pull-up module connected to a first stage transmission signal, a clock signal and a first node, wherein the pull-up module is configured to control a potential of the first node according to the first stage transmission signal and the clock signal, the first stage transmission signal is a scanning signal output by a (N−K)-th stage of the gate driving sub-circuits, and K is greater than 0 and less than N;

a pull-down module connected to a preset low potential, a second stage transmission signal and the first node, wherein the pull-down module is configured to control the potential of the first node according to the preset low potential and the second stage transmission signal, the second stage transmission signal is a scanning signal output by a (N+M)-th stage of the gate driving sub-circuits, and M is greater than 0; and an output control module connected to a control signal, the preset low potential, the first node, and an output port, wherein the output control module is configured to output a driving signal to a row of sub-pixels corresponding to the N-th stage of the gate driving sub-circuits through the output port according to the control signal, the preset low potential and the potential of the first node;

wherein the output control module comprises:

a first transistor comprising a control electrode connected to the first node, a first electrode connected to the first node, and a second electrode connected to a second node;

a second transistor comprising a control electrode connected to the second node, a first electrode connected to the first node, and a second electrode connected to the output port;

a third transistor comprising a control electrode connected to the control signal, a first electrode connected to the second node, and a second electrode connected to the preset low potential; and a fourth transistor comprising a control electrode connected to the control signal, a first electrode connected to the output port, and a second electrode connected to the preset low potential.

11. The display panel of claim 10, wherein the output control module is further configured to:

control the output port to output the preset low potential to the row of sub-pixels corresponding to the N-th stage of the gate driving sub-circuits in a case where the control signal is at a high potential; and control the output port to output the potential of the first node to the row of sub-pixels corresponding to the N-th stage of the gate driving sub-circuits in a case where the control signal is at a low potential.

12. The display panel of claim 11, wherein, in a first period t1, k-th to m-th stages of the gate driving sub-circuits are connected to the control signal of a first type, and (m+1)-th to n-th stages of the gate driving sub-circuits are connected to the control signal of the first type;

in a second period t2, the k-th to m-th stages of the gate driving sub-circuits are connected to the control signal of the first type, and the (m+1)-th to n-th stages of the gate driving sub-circuits are connected to the control signal of a second type; and m is greater than k and less than n, t1 is greater than 0, t2 is greater than 0, one of the control signal of the first type and the control signal of the second type is at a high potential, and another one of the control signal of the first type and the control signal of the second type is at a low potential.

13. The display panel of claim 12, wherein, in the first period t1, (n+1)-th to x-th stages of the gate driving sub-circuits are connected to the control signal of the first type; and in the second period t2, the (n+1)-th to x-th stages of the gate driving sub-circuits are connected to the control signal of the first type;

wherein x is greater than n.

14. The display panel of claim 13, wherein, in a third period t3, the k-th to m-th stages of the gate driving sub-circuits are connected to the control signal of the first type, the (m+1)-th to n-th stages of the gate driving sub-circuits are connected to the control signal of the second type, the (n+1)-th to x-th stages of the gate driving sub-circuits are connected to the control signal of the second type, and t3 is greater than 0.

* * * * *